(12) United States Patent
Davis et al.

(10) Patent No.: US 8,190,394 B2
(45) Date of Patent: May 29, 2012

(54) SYSTEM AND METHODS FOR MONITORING OIL CONDITIONS OF A WIND TURBINE GEARBOX

(75) Inventors: John Paul Davis, Duanesburg, NY (US); Maria Cecilia Mazzaro, Simpsonville, SC (US); Jack Darrin Oates, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/149,396

(22) Filed: May 31, 2011

(65) Prior Publication Data

US 2012/0025529 A1 Feb. 2, 2012

(51) Int. Cl.
*G06F 19/00* (2011.01)

(52) U.S. Cl. ....................................................... 702/179

(58) Field of Classification Search ........... 702/182–185
See application file for complete search history.

(56) References Cited

U.S. PATENT DOCUMENTS

| 6,853,954 B2 | 2/2005 | Apostolides |
| 7,521,945 B2 | 4/2009 | Hedges et al. |

FOREIGN PATENT DOCUMENTS

| EP | 1 760 311 | 7/2007 |
| EP | 2 088 316 | 12/2009 |

*Primary Examiner* — Edward Raymond
(74) *Attorney, Agent, or Firm* — Dority & Manning, P.A.

(57) ABSTRACT

A method for monitoring the condition of oil contained within a gearbox of a wind turbine is disclosed. The method generally includes receiving a signal corresponding to a measurement of an oil parameter of the gearbox, comparing the measurement to a predetermined limit for the oil parameter, assigning a severity level based on the comparison of the measurement to the predetermined limit and determining a recommended course of action for the wind turbine based on the severity level.

20 Claims, 8 Drawing Sheets

SYSTEM AND METHODS FOR MONITORING OIL CONDITIONS OF A WIND TURBINE GEARBOX

FIELD OF THE INVENTION

The present subject matter relates generally to wind turbines and, more particularly, to a system and/or methods for monitoring the condition of oil contained within a gearbox of a wind turbine.

BACKGROUND OF THE INVENTION

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

Lubrication systems are often used within wind turbines to circulate oil throughout the gearbox, thereby decreasing the friction between the moving components of the gearbox as well as providing cooling for such components. However, over time, the condition of the oil can degrade significantly. As such, the oil condition must be inspected periodically to prevent unnecessary damage to the gearbox due to, for example, component wear caused by excessive amounts of metallic particles and/or other debris contained within the oil. Currently, gearbox inspection methods require that a wind turbine be shutdown to permit a maintenance worker to climb into the nacelle and gain access to the interior of the gearbox. Thus, conventional inspection methods can be very costly as well as time and labor intensive. As a result, scheduled inspections of the gearbox are typically infrequent, thereby increasing the likelihood of damage occurring to the gearbox due to degraded oil conditions.

Accordingly, a system and/or methods that allow for the online monitoring of oil conditions within the gearbox would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present subject matter discloses a method for monitoring the condition of oil contained within a gearbox of a wind turbine. The method generally includes receiving a signal corresponding to a measurement of an oil parameter of the gearbox, comparing the measurement to a predetermined limit for the oil parameter, assigning a severity level based on the comparison of the measurement to the predetermined limit and determining a recommended course of action for the wind turbine based on the severity level.

In another aspect, the present subject matter discloses a method for monitoring the condition of oil contained within a gearbox of a wind turbine. The method generally includes receiving signals corresponding to a plurality of measurements of an oil parameter of the gearbox, determining a time measurement of a service interval of the gearbox, comparing the time measurement to a predetermined time limit and, in the event that the time measurement exceeds the predetermined time limit, determining a recommended course of action based on analysis of the plurality of measurements.

In a further aspect, the present subject matter discloses a system for monitoring the condition of oil contained within a gearbox of a wind turbine. The system may generally include a sensor configured to measure an oil parameter of the gearbox and a controller communicatively coupled to the sensor such that oil parameter measurements made by the sensor may be transmitted to the controller. The controller may be configured to compare the oil parameter measurements to a predetermined limit for the oil parameter and assign a severity level to the oil parameter measurement.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter discloses a system and/or methods for online monitoring of the condition of oil contained within a gearbox of a wind turbine. For instance, in several embodiments, one or more sensors may be mounted through and/or disposed within the gearbox to permit one or more oil parameters (e.g., oil temperature, oil viscosity, particle count, particle size and/or water content) of the gearbox to be measured. The sensors may permit the oil condition to be monitored locally or remotely in real time by transmitting signals corresponding to the oil parameter measurements to a controller (e.g., a turbine controller of the wind turbine and/or a separate controller located remote to the wind turbine) for subsequent analysis using suitable software, algorithms and/or decision logic. As a result of the acquisition and analysis of such measurements, it may be determined and/or predicted when damage may occur to any of the components of the gearbox and/or the severity/extent of any damage that may have already occurred due to degrading oil conditions. Accordingly, a recommended course of action (e.g., reactive and/or proactive maintenance) may be determined to prevent further and/or future damage from occurring to the gearbox.

Figure 1:
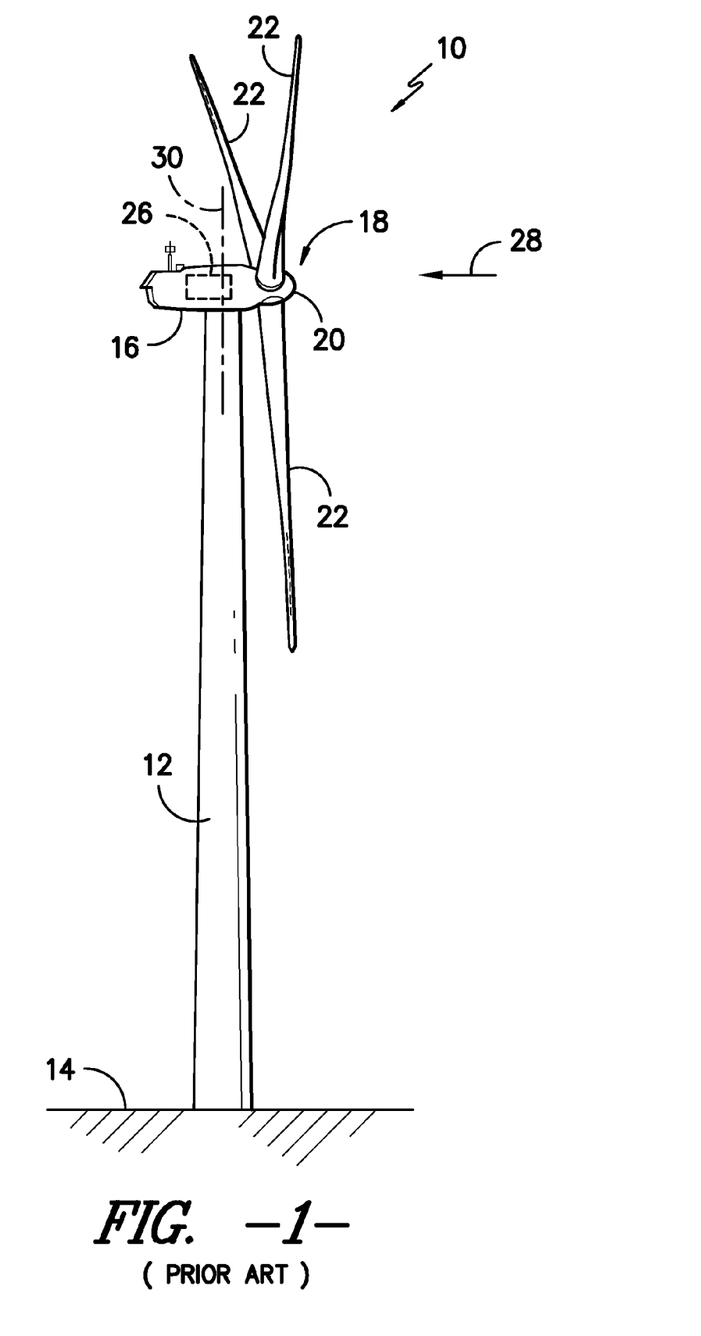
FIG. 1 illustrates a perspective view of one embodiment of a wind turbine of conventional construction.

Referring now to the drawings, FIG. 1 illustrates a perspective view of one embodiment of a wind turbine 10 of conventional construction. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or a turbine controller 26 centralized within the nacelle 16. However, it should be appreciated that the turbine controller 26 may be disposed at any location on or in the wind turbine 10, at any location on the support surface 14 or generally at any other location. In general, the turbine controller 26 may be configured to transmit and execute wind turbine control signals and/or commands in order to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to control the load and power output generated by the wind turbine 10 by adjusting an angular position of at least one rotor blade 22 relative to the wind. For instance, the turbine controller 26 may control the pitch angle of the rotor blades 22, either individually or simultaneously, by transmitting suitable control signals/commands to a pitch drive or pitch adjustment mechanism (not shown) of the wind turbine 10. Further, as the direction 28 of the wind changes, the turbine controller 26 may be configured to control a yaw direction of the nacelle 16 about a yaw axis 30 to position the rotor blades 22 with respect to the direction 28 of the wind, thereby controlling the load and power output generated by the wind turbine 10. For example, the turbine controller 26 may be configured to transmit control signals/commands to a yaw drive mechanism (not shown) of the wind turbine 10 such that the nacelle 16 may be rotated about the yaw axis 30.

Figure 2:
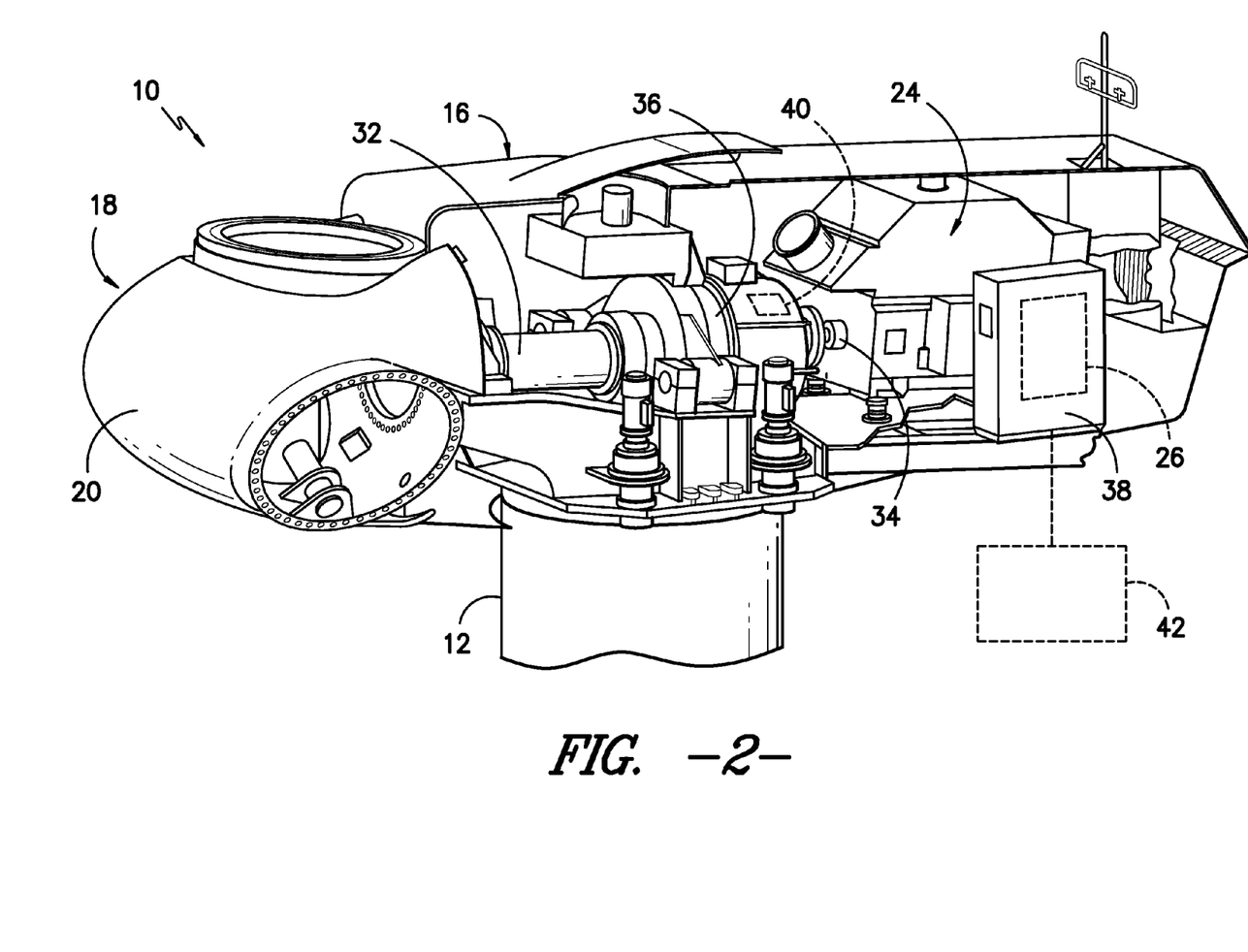
FIG. 2 illustrates a perspective, interior view of one embodiment of a nacelle of a wind turbine.

Referring now to FIG. 2, a simplified, internal view of one embodiment of a nacelle 16 of a wind turbine 10 is illustrated. As shown, a generator 24 may be disposed within the nacelle 16. In general, the generator 24 may be coupled to the rotor 18 of the wind turbine 10 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

It should be appreciated that the gearbox 36 may generally comprise any suitable gearbox known in the art. For instance, in one embodiment, the gearbox 36 may comprise a planetary gearbox including a plurality of gears (e.g., planetary, ring and/or sun gears) and bearings (not shown) for converting the low speed, high torque input of the rotor shaft 32 to a high speed, low torque output for the generator 24. Additionally, in one embodiment, the gearbox 36 may include multiple gears stages, with each gear stage increasing the input speed and decreasing the input torque. Moreover, the gearbox 36 may include a lubrication system (not shown) or other means for circulating oil throughout the gearbox 36. As is generally understood, the oil may be used to reduce friction between the moving components of the gearbox 36 and may also be utilized to provide cooling for such components, thereby decreasing component wear and other losses within the gearbox 36 and increasing the lifespan of the gearbox 36.

Additionally, as indicated above, a turbine controller 26 may also be located within the nacelle 16 of the wind turbine 10. For example, as shown in the illustrated embodiment, the turbine controller 26 is disposed within a control cabinet 38 mounted to a portion of the nacelle 16. However, in other embodiments, the turbine controller 26 may be disposed at any other suitable location on and/or within the wind turbine 10 or at any suitable location remote to the wind turbine 10.

Moreover, the wind turbine 10 may also include one or more sensors for detecting, sensing and/or measuring one or more operating parameters and/or operating conditions of the wind turbine 10. Thus, in several embodiments, the wind turbine 10 may include one or more sensors 40 (shown in dashed lines) for detecting, sensing and/or measuring one or more oil parameters of the gearbox 36. As used herein, the term "oil parameter" may refer to any characteristic and/or property that provides an indication of the operating state and/or condition of the oil contained within the gearbox 36. For instance, in one embodiment, oil parameters may include, but are not limited to, oil temperature, oil viscosity, the number of particles and/or debris (e.g., metallic particles due to component wear) contained within the oil (referred to herein as "particle count"), the size of the particles and/or debris contained within the oil (referred to herein as "particle size') and/or the water content of the oil.

In general, the sensor(s) 40 may comprise any suitable sensors and/or other sensing devices known in the art for detecting, sensing and/or measuring one or more of the oil parameters of the gearbox 36. For example, to measure the oil temperature, the sensor(s) 40 may comprise one or more temperature sensors mounted through and/or disposed within the gearbox 36. Suitable temperature sensors may include, but are not limited to, thermocouples, thermometers, fiber optic temperature sensors, thermal imagers and/or the like. Similarly, to measure the oil viscosity, the sensor(s) 40 may comprise one or more viscosity sensors mounted through and/or disposed within the gearbox 36. For example, suitable viscosity sensors are known that perform temperature compensated viscosity measurements using capacitance and/or dielectric methods. Moreover, other suitable viscosity sensors are known that utilize micromechanical resonators and/or microacoustic devices, together with signal processing algorithms, to measure oil viscosity.

Additionally, to measure particle count and particle size, the sensor(s) 40 may comprise one or more particle and/or debris sensors mounted through and/or disposed within the gearbox 36. For instance, suitable metallic particle and/or debris sensors are known that utilize inductive coil technology, magnetometry technology and/or electromagnetic technology, together with suitable algorithms, to determine both the count and size of metallic particles contained within oil. Similarly, to measure the water content of the oil, the sensor(s) 40 may comprise one or more moisture and/or humidity sensors mounted through and/or disposed within the gearbox 36. For example, suitable moisture and/or humidity sensors are known that determine water content by measuring the percentage relative humidity of oil using electronic impedance and/or capacitance sensors together with suitable algorithms.

It should be appreciated that the disclosed sensor(s) 40 need not be limited to the sensor technologies described above. Rather, any suitable sensor technology may be utilized to measure the oil parameters of the gearbox 36. Additionally, one of ordinary skill in the art should appreciate that oil condition sensors are known in the art that are capable of measuring multiple oil parameters. For example, known oil conditions sensors are available that measure both oil temperature and oil viscosity.

Further, as shown in FIG. 2, in several embodiments, the turbine controller 26 may be communicatively coupled to a separate controller 42 (shown in dashed lines) to allow control and/or command signals to transmitted from the separate controller 42 to the turbine controller 26 and/or to allow signals/data received by the turbine controller 26 to be transmitted to the separate controller 42. For instance, in one embodiment, the turbine controller 26 may be communicatively coupled to the separate controller 42 through a wired connection, such as by connecting the controllers 26, 42 through a suitable communicative link (e.g., a suitable cable). Alternatively, the turbine controller 26 may be communicatively coupled to the separate controller 42 through a wireless connection, such as by using any suitable wireless communications protocol known in the art.

In general, the separate controller 42 may comprise any suitable computer and/or processing unit positioned remote to the turbine controller 26. For example, in several embodiments, the separate controller 42 may comprise a farm controller configured to control multiple wind turbines 10 within a wind turbine farm, a remote monitoring system for remotely monitoring operational data of the wind turbine 10, a centralized controller for remotely controlling the wind turbine 10 and/or any other suitable controller, monitoring system and/or processing unit.

It should be appreciated that, in several embodiments of the present subject matter, the disclosed sensor(s) 40 may be communicatively coupled to the turbine controller 26 to permit signals corresponding to oil parameter measurements captured by the sensor(s) 40 to be transmitted to the turbine controller 26. Thus, in embodiments in which the turbine controller 26 is communicatively coupled to the separate controller 26, the signals received from the sensors 40 may then be transmitted to the separate controller 42 to allow for remote monitoring of the oil condition of the gearbox 36. However, in alternative embodiments, the disclosed sensor(s) 40 may be directly coupled to the separate controller 42 such that signals transmitted from the sensor(s) 40 may be communicated directly to the separate controller 26.

Figure 3:
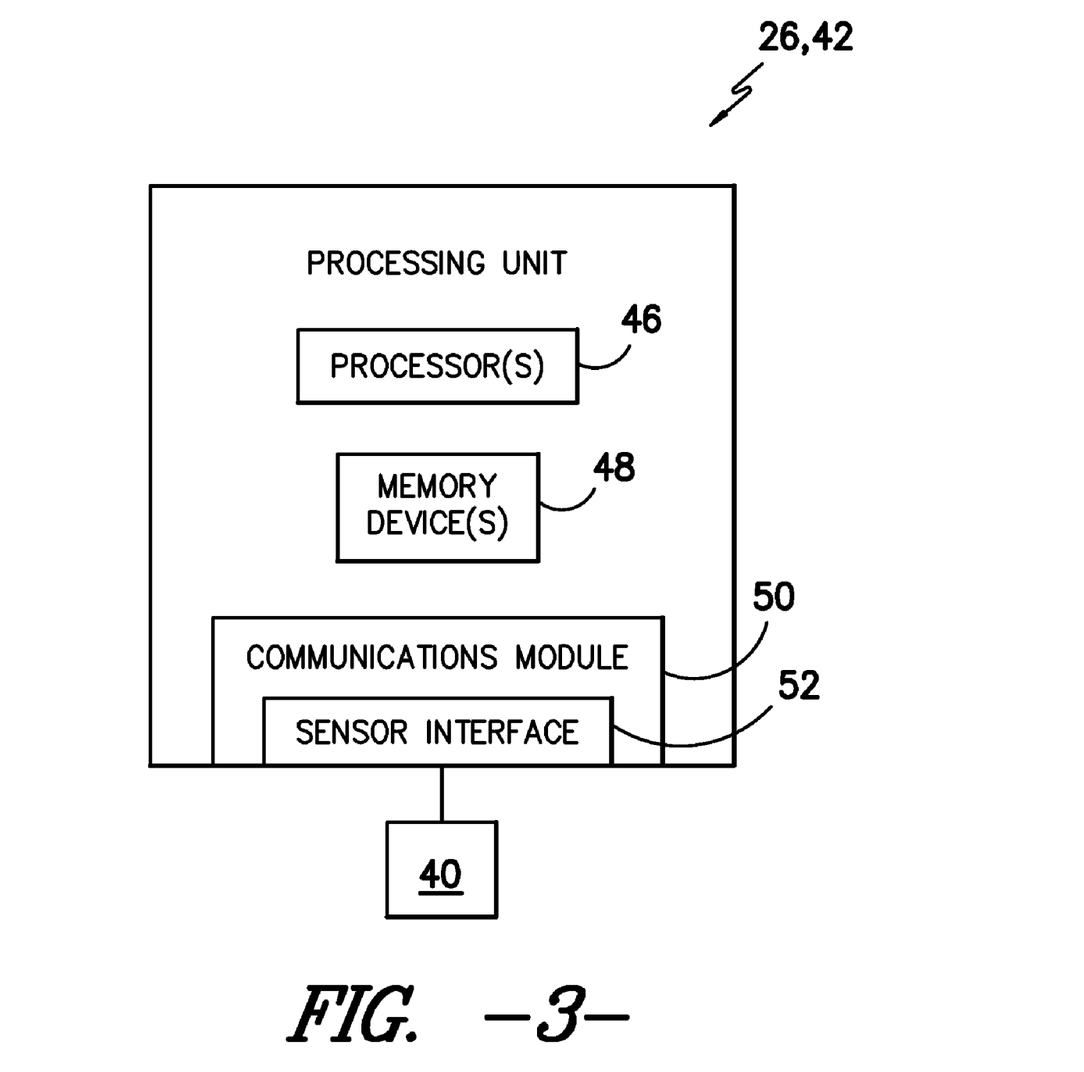
FIG. 3 illustrates a schematic diagram of one embodiment of suitable components that may be included within one or more controllers used to perform the methods disclosed herein.

Referring now to FIG. 3, there is illustrated a block diagram of one embodiment of suitable components that may be included within the turbine controller 26 and/or the separate controller 42 in accordance with aspects of the present subject matter. As shown, the turbine controller 26 and/or the separate controller 42 may include one or more processor(s) 46 and associated memory device(s) 48 configured to perform a variety of computer-implemented functions (e.g., performing the methods, decision logic, steps, operations, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 48 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 48 may generally be configured to store suitable computer-readable instructions that, when implemented by the processor(s) 46, configure the turbine controller 26 and/or the separate controller 42 to perform various functions including, but not limited to, executing the method elements and/or decision logic described below. The memory device(s) 48 may also be used to store temporary input and output variables and other immediate information during execution by the processor(s) 46 of the computer-readable instructions and/or to record/archive oil parameter measurements transmitted by the sensor(s) 40.

Additionally, the turbine controller 26 and/or separate controller 42 may also include a communications module 50 to facilitate communication with the various components of the wind turbine 10. In several embodiments, the communications module 50 may include a sensor interface 52 to permit the disclosed sensor(s) 40 to transmit output signals (e.g., corresponding to oil parameter measurements) to the turbine controller 26 and/or separate controller 42. Specifically, as shown, the sensor(s) 40 may be communicatively coupled to the turbine controller 26 and/or the separate controller 42 through the sensor interface 52.

It should be appreciated that, in one embodiment, the sensor(s) 40 may be communicatively coupled to the sensor interface 52 through a wired connection, such as by coupling the sensor(s) 40 to the sensor interface 52 through a cable or other suitable communicative link. Alternatively, the sensor(s) 40 may be communicatively coupled to the sensor interface 52 through a wireless connection. For example, the sensor(s) 40 may be equipped with a suitable antenna(s) for transmitting signals/data to the sensor interface 52 through any suitable wireless communications protocol. In such an embodiment, the communications module 50 may also include a suitable antenna for receiving the signal/data transmissions and/or for otherwise wirelessly communicating with the sensor(s) 40.

It should also be appreciated that a suitable sensor interface 52 may include, for instance, one or more analog-to-digital converters configured to convert analog signals into digital signals that can be received and/or used by the processor(s) 46 of the turbine controller 26 and/or the separate controller 42.

Figure 4:
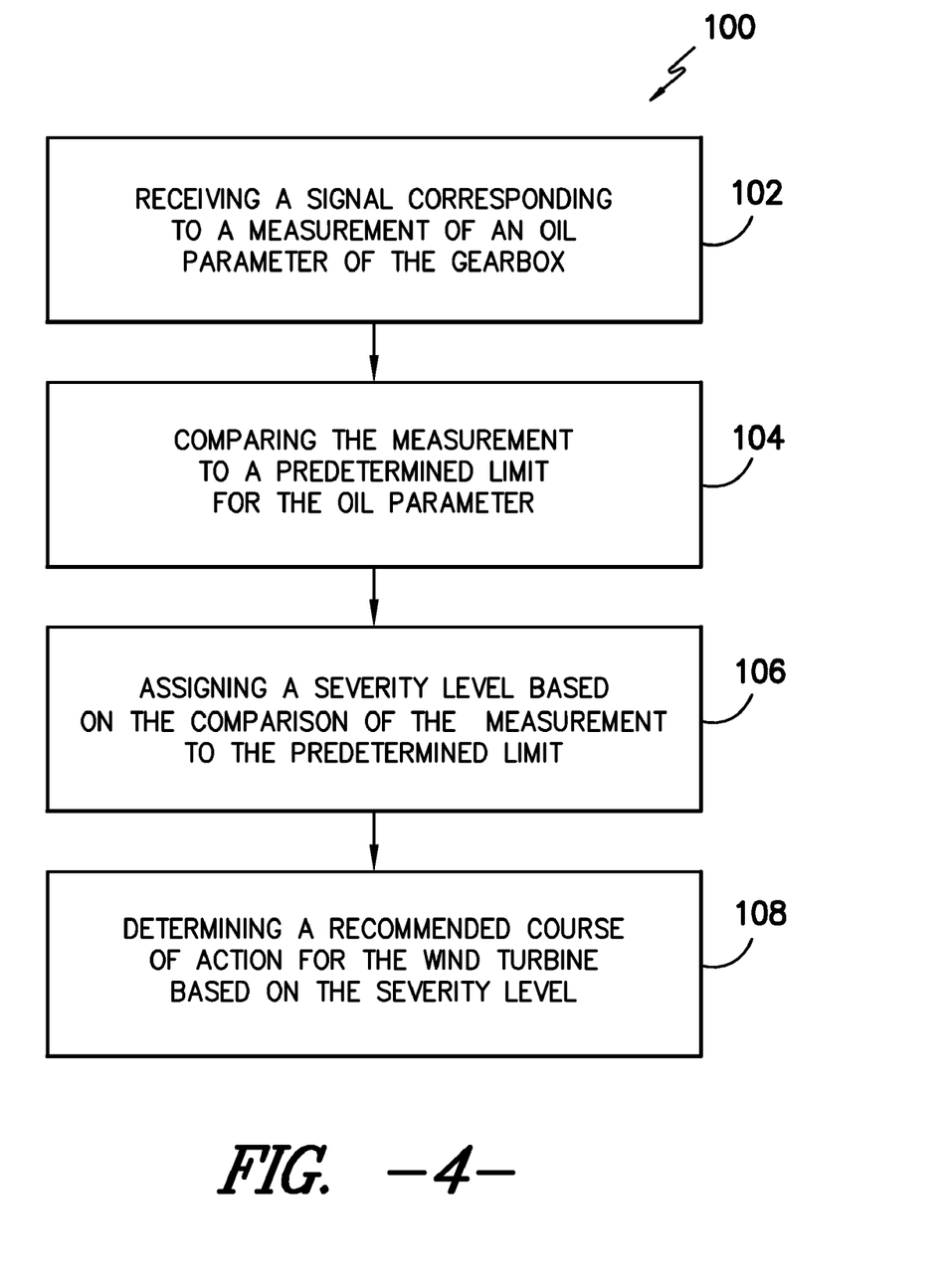
FIG. 4 illustrates a flow diagram of one embodiment of a method for monitoring the condition of oil contained within a gearbox of a wind turbine.

Referring now to FIG. 4, a flow diagram of one embodiment of a method 100 for monitoring the condition of the oil contained within the gearbox 36 (FIG. 2) is illustrated in accordance with aspects of the present subject matter. As shown, the method 100 generally includes receiving a signal corresponding to a measurement of an oil parameter of the gearbox 102, comparing the measurement to a predetermined limit for the oil parameter 104, assigning a severity level based on the comparison of the measurement to the predetermined limit 106 and determining a recommended course of action for the wind turbine based on the severity level 108. It should be appreciated that, although the various method elements 102, 104, 106, 108 of the disclosed method 100 are illustrated in a particular order in FIG. 4, the method elements 102, 104, 106, 108 may generally be performed in any sequence and/or order consistent with the disclosure provided herein.

In general, the disclosed method 100 may permit the oil condition of the gearbox 36 (FIG. 2) to be monitored locally or remotely in real time by obtaining measurements of one or more of the oil parameters using the disclosed sensor(s) 40 (FIG. 2) and transmitting signals corresponding to such measurements to the turbine controller 26 and/or the separate controller 42 for subsequent analysis using software, algorithms and/or decision logic stored as computer-readable instructions within such controller(s) 26, 42. Such online monitoring of the oil condition generally provides numerous advantages. For example, the acquisition and analysis of real time data corresponding to the oil condition of the gearbox 36 may allow for the determination and/or estimation of the severity and/or extent of any damage that may be presently occurring to the components of the gearbox 36 and/or for the determination and/or estimation of when such components may begin to be subject to damage due to degrading oil conditions and/or any other detectable gearbox 36 failure modes (e.g., degrading gear and/or bearing conditions). As a result, a recommended course of action (e.g., reactive and/or proactive maintenance) may be established based on the determination of the oil condition and/or any damage that has or may occur to the gearbox 36. For instance, based on the analysis of the oil parameter measurements, it can be determined whether immediate action may need to be performed (e.g., by shutting down the wind turbine 10 to prevent significant damage to the gearbox 36 or the wind turbine 10) or if some maintenance operation (e.g., changing the oil within the gearbox 36 and/or replacing the oil filter) may need to be performed at a particular time in the future.

Additionally, it should be appreciated that, in several embodiments, the various method elements 102, 104, 106, 108 shown in FIG. 4, as well as the decision logic described below, may be performed solely by the turbine controller 26, solely by the separate controller 42 or partly by the turbine controller 26 and partly by the separate controller 42. For example, as indicated above, in one embodiment, the turbine controller 26 may be communicatively coupled to the sensor (s) 40 and, thus, may be configured to receive the oil parameters measurements provided by the sensor(s) 40. In such an embodiment, the turbine controller 26 may also include suitable computer-readable instructions that, when implemented, enable the turbine controller 26 to analyze the oil parameter measurements, such as by analyzing the measurements in accordance with the decision logic shown in FIGS. 5-8. Alternatively, the turbine controller 26 may be configured to transmit the oil parameter measurements to the separate controller 42 for subsequent analysis of the measurements by such controller 42.

Figure 5:
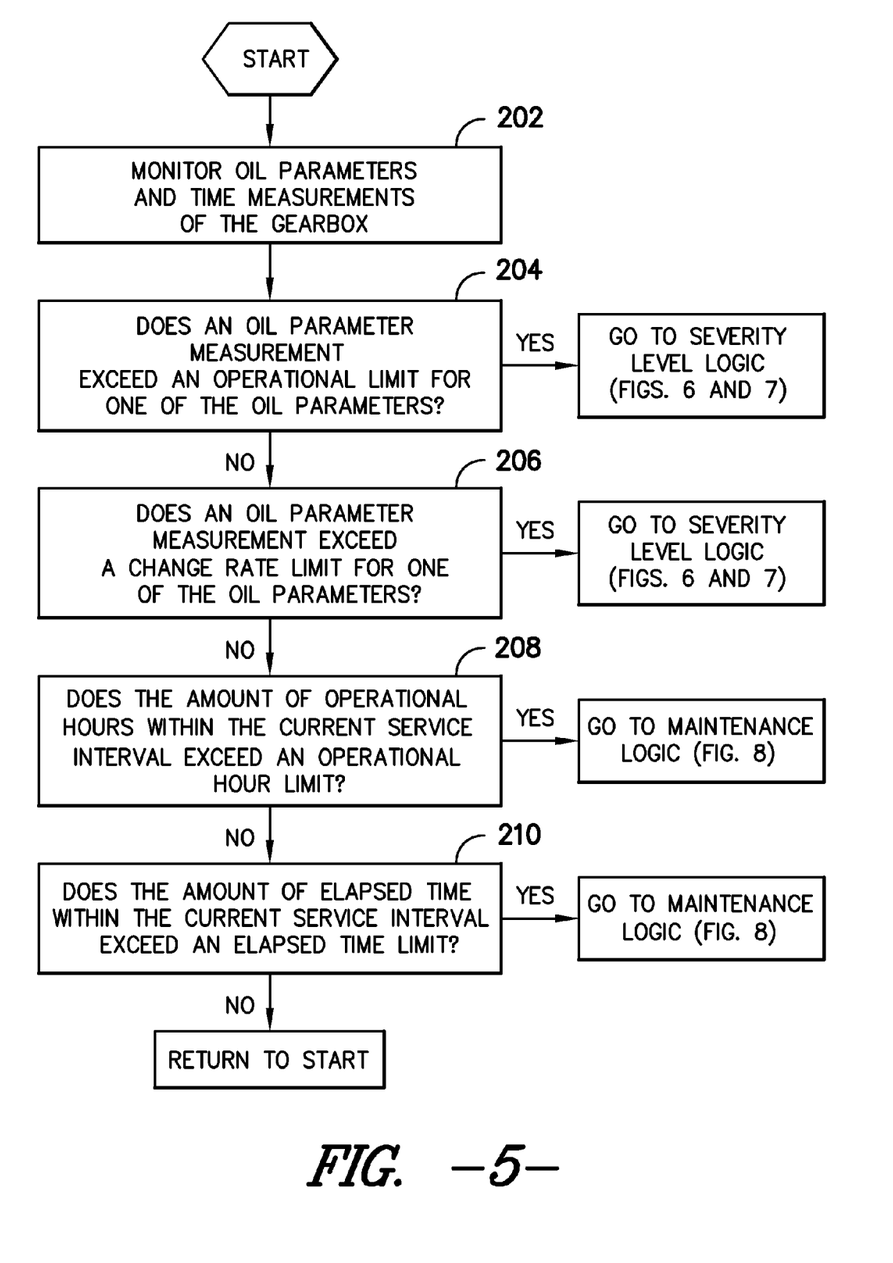
FIG. 5 illustrates a portion of one embodiment of decision logic that may be used to monitor the condition of oil contained within a gearbox of a wind turbine.
Figure 6:
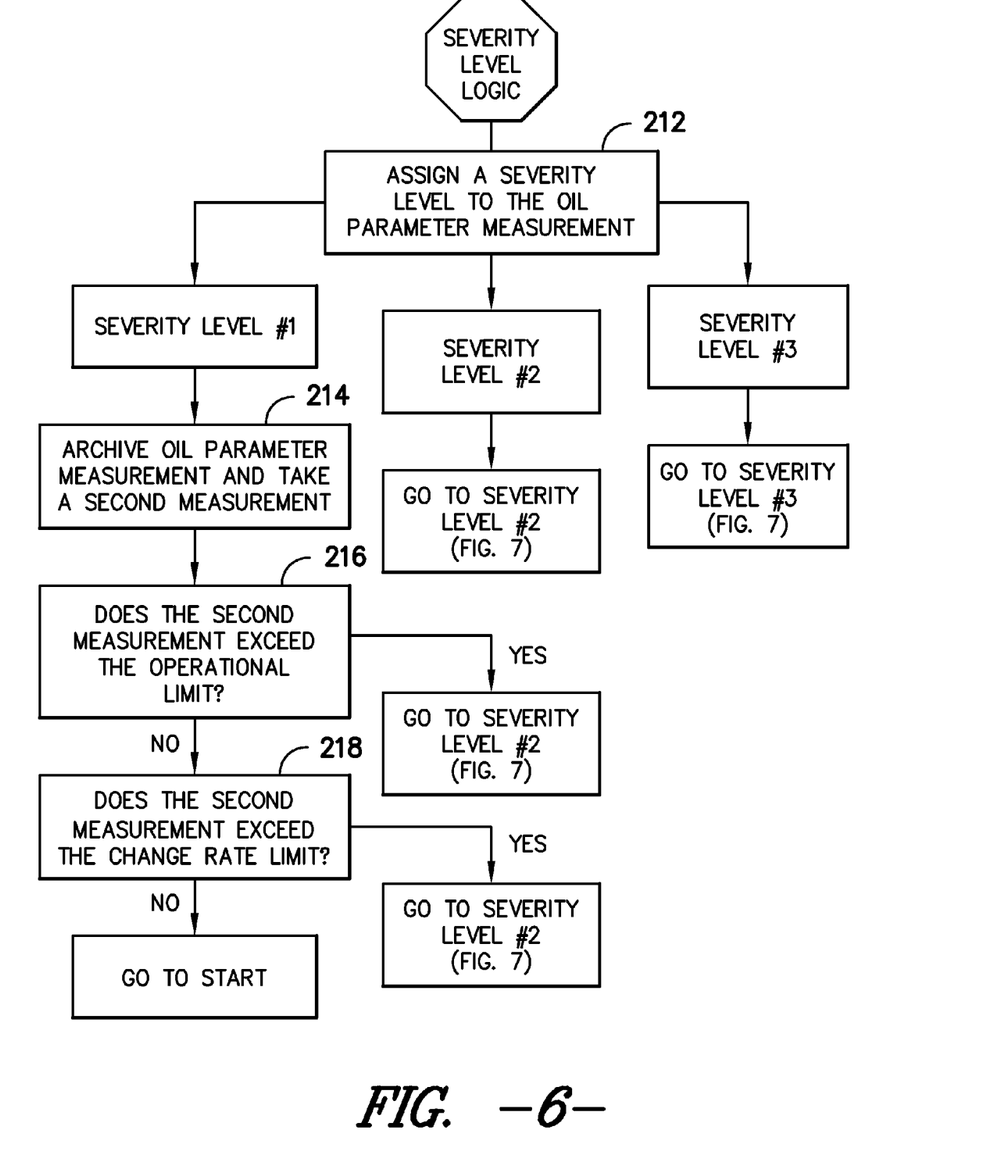
FIG. 6 illustrates another portion of one embodiment of decision logic that may be used to monitor the condition of oil contained within a gearbox of a wind turbine.
Figure 7:
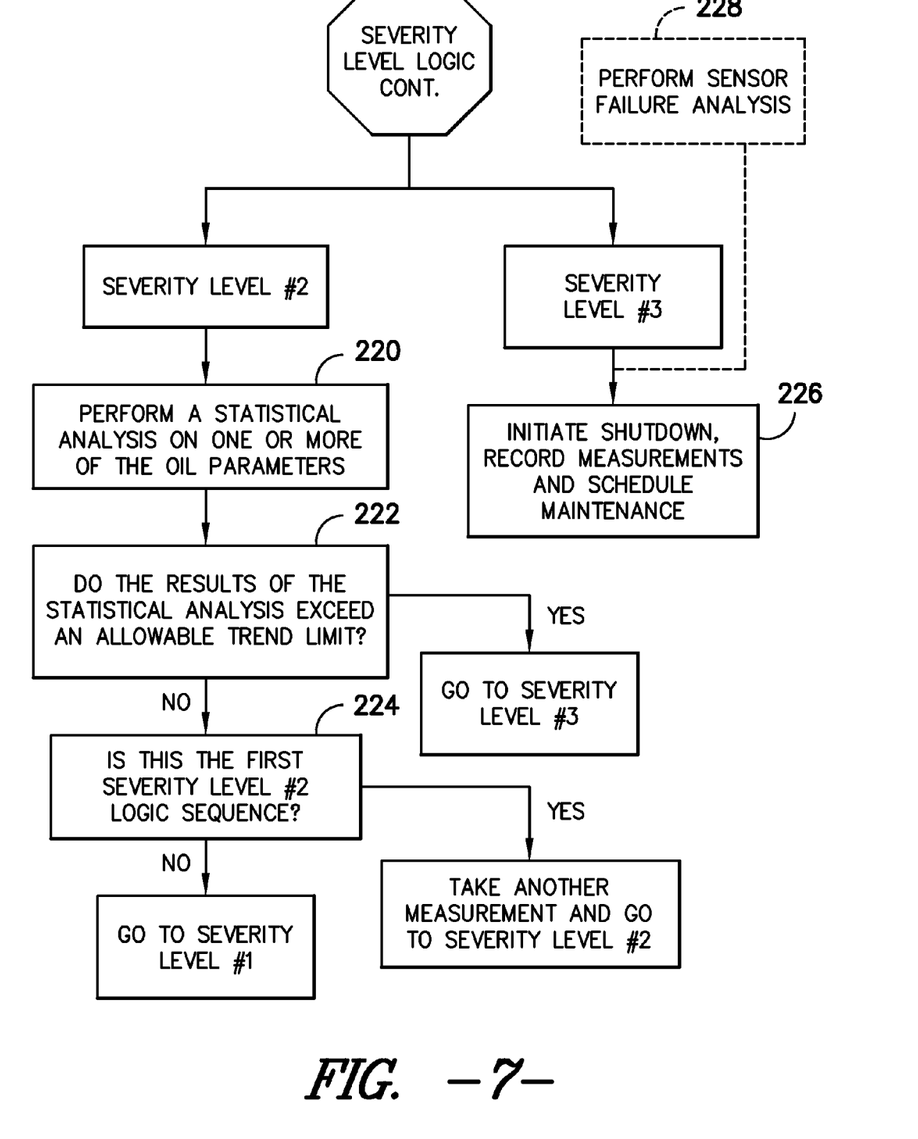
FIG. 7 illustrates a further portion of one embodiment of decision logic that may be used to monitor the condition of oil contained within a gearbox of a wind turbine; and, FIG. 8 illustrates yet another portion of one embodiment of decision logic that may be used to monitor the condition of oil contained within a gearbox of a wind turbine.
Figure 8:
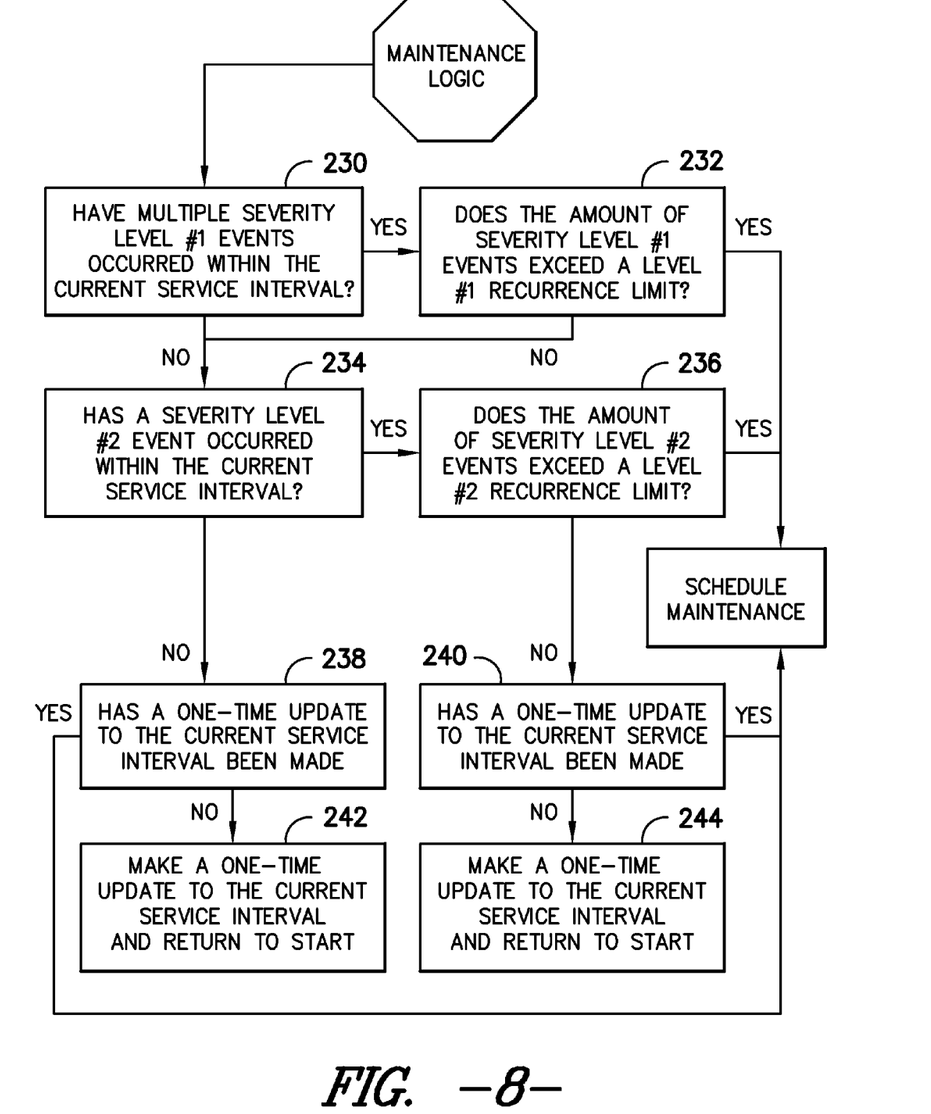

Referring now to FIGS. 5-8, one embodiment of a detailed flowchart that may be utilized in performing the methods disclosed herein is illustrated in accordance with aspects of the present subject matter. In particular, the illustrated flowchart provides decision logic that may be performed by the turbine controller 26 and/or the separate controller 42 for locally and/or remotely monitoring the condition of the oil contained within the gearbox 36 (FIG. 2). For instance, FIG. 5 illustrates a portion of the flowchart corresponding to decision logic for monitoring the oil parameters and/or the service interval of the gearbox 36 and for comparing such parameters and/or interval to predetermined parameter and/or time limits. Similarly, FIGS. 6 and 7 illustrate a portion of the flowchart corresponding to decision logic for determining both the Severity Level of an oil parameter measurement that exceeds one or more of the predetermined parameter limits and the steps taken for each Severity Level. Additionally, FIG. 8 illustrates a portion of the flowchart corresponding to decision logic for determining when to schedule maintenance when a time measurement of the gear box 32 exceeds one or more of the predetermined time limits.

As shown in FIG. 5, in 202, the oil parameters and/or the time measurements of gearbox 36 may be monitored. As indicated above, the oil parameters may be continuously monitored using the disclosed sensor(s) 40 (FIG. 2). Thus, at a predetermined timestep or sampling rate (e.g., every 10 minutes), the sensor(s) 40 may be configured to measure the oil parameters and transmit such measurements to the turbine controller 26 and/or separate controller 42 for subsequent analysis.

In addition, the turbine controller 26 and/or separate controller 42 may include suitable software instructions for monitoring time measurements within the current service interval of the gearbox 36. As used herein, the term "service interval" refers to an amount of time referenced from the last maintenance operation performed on the gearbox 36 (e.g., changing the oil and/or replacing the oil filter). For example, in several embodiments, the service interval may comprise a time measurement corresponding to the amount of operational hours of the wind turbine since the last maintenance operation was performed on the gearbox 36 and/or a time measurement corresponding to the amount of elapsed time since the last maintenance operation was performed gearbox 36. In such embodiments, the turbine controller 26 and/or the separate controller 42 may include suitable software instructions for monitoring the amount of operational hours and/or elapsed time since the last maintenance operation was performed.

In 204, each oil parameter measurement may be compared to an operational limit. In general, each operational limit may correspond to a predetermined measurement value for each oil parameter at which it is believed that the gearbox 36 may begin to be subject to damage (i.e., damage above that of normal wear and tear). For instance, in one embodiment, the operational limit for the oil temperature within the gearbox 36 may correspond to a predetermined temperature value at which it is believed that the gearbox 36 may begin to be subject to damage due to excessive temperatures. As shown in FIG. 2, if at least one of the oil parameter measurements exceeds its corresponding operational limit, the decision logic pertaining to the Severity Level of the oil parameter measurement may be performed (described below with reference to FIGS. 6 and 7). However, if none of the oil parameter measurements exceed their corresponding operational limits, the decision logic pertaining to change rate limits shown in 206 may be performed.

It should be readily appreciated that the operational limit for each oil parameter may generally vary depending on numerous factors including, but not limited to, the operating conditions of the gearbox 36, the size and oil capacity of the gearbox 36, the material properties of the components contained within the gearbox 36 and/or any historical data available regarding operation of the gearbox 36. However, it is well within the purview of one of ordinary skill in the art to determine such operational limits based on the characteristics of the gearbox 36 and/or any other suitable factors.

In 206, each oil parameter measurement may be compared to a change rate limit. In general, the change rate limit may correspond to a predetermined differential value for each oil parameter at which it is believed that the gearbox 36 may begin to be subject to damage (i.e., damage above that of normal wear and tear) due to the differential between consecutive measurements for a particular oil parameter. For instance, in one embodiment, the change rate limit for the oil temperature may correspond to a predetermined temperature differential (e.g., a predetermined increase in temperature between consecutive oil temperature measurements) at which it is believed that the gearbox 36 may begin to be subject to damage due to significant temperature variations within the gearbox 36. As shown in FIG. 5, if at least one of the oil parameter measurements exceeds its corresponding change rate limit, the decision logic pertaining to the Severity Level of the oil parameter measurement may be performed (described below with reference to FIGS. 6 and 7). However, if none of the oil parameter measurements exceed their corresponding change rate limits, the decision logic pertaining to the operational hour limit shown in 208 may be performed.

It should be readily appreciated that the change rate limit for each oil parameter may generally vary depending on numerous factors including, but not limited to, the operating conditions of the gearbox 36, the size and oil capacity of the gearbox 36, the material properties of the components contained within the gearbox 36 and/or any historical data available regarding operation of the gearbox 36. However, it is well within the purview of one of ordinary skill in the art to determine such change rate limits based on the characteristics of the gearbox 36 and/or any other suitable factors.

Referring still to FIG. 5, in 208, the amount of operational hours within the current service interval may be compared to an operational hour limit for the gearbox 36. In general, the operational hour limit may correspond to a predetermined time measurement at which, due to the amount of hours that the wind turbine 10 and, thus, the gearbox 36 has been operating since the last maintenance operation was performed, it is believed that the gearbox 36 may begin to be subject to damage (i.e., damage above that of normal wear and tear). As shown in FIG. 5, if the amount of operational hours exceed the operational hour limit, the decision logic pertaining to scheduling maintenance operations on the gearbox 36 may be performed (described below with reference to FIG. 8). However, if the amount of operational hours does not exceed the operational hour limit, the decision logic pertaining to the elapsed time limit shown in 210 may be performed.

It should be readily appreciated that the operational hour limit for the gearbox 36 may generally vary depending on numerous factors including, but not limited to, the operating conditions of the gearbox 36, the predetermined lifespan of the gearbox 36 and/or any historical data available regarding operation of the gearbox 36. However, it is well within the purview of one of ordinary skill in the art to determine the operational hour limit for the gearbox 36 based on the characteristics of the gearbox 36, routine maintenance scheduling practices and/or any other suitable factors.

In 210, the amount of elapsed time within the current service interval may be compared to an elapsed time limit for the gearbox 36. In general, the elapsed time limit may correspond to a predetermined time measurement at which, due to the total amount of time elapsed since the last maintenance operation was performed on the gearbox 36, it is believed that the gearbox 36 may begin to be subject to damage (i.e., damage above that of normal wear and tear). As shown in FIG. 5, if the amount of elapsed time exceeds the elapsed time limit, the decision logic pertaining to scheduling maintenance operations for the gearbox 36 may be performed (described below with reference to FIG. 8). However, if the amount of elapsed time does not exceed the elapsed time limit, the decision logic may be returned to START. In other words, when the amount of elapsed time does not exceed the elapsed time limit, the flowchart generally assigns a healthy or Severity Level #0 status to the oil parameter measurement, indicating that no further action within the decision logic is required for that particular sequence and returning to decision logic to START, whereat new oil parameter and/or time measurements will be obtained in accordance with 202.

It should be readily appreciated that the elapsed time limit for the gearbox 36 may generally vary depending on numerous factors including, but not limited to, the operating conditions of the gearbox 36, the predetermined lifespan of the gearbox 36 and/or any historical data available regarding operation of the gearbox 36. However, it is well within the purview of one of ordinary skill in the art to determine the elapsed time limit for the gearbox 36 based on the characteristics of the gearbox 36, routine maintenance scheduling practices and/or any other suitable factors.

Referring particularly now to FIGS. 6 and 7, one embodiment of a Severity Level logic sequence that may be performed when it is determined that one of the oil parameter measurements exceeds the predetermined operational and/or change rate limit for a particular oil parameter is illustrated. As shown, in 212, a Severity Level is assigned to the oil parameter measurement. The particular Severity Level assigned may generally vary depending on the extent to which the oil parameter measurement exceeds its parameter limit. For instance, as shown in FIG. 6, in several embodiments, the decision logic includes three different Severity Levels (i.e., Severity Level #1, Severity Level #2 and Severity Level #3). Each of the Severity Levels for a particular oil parameter measurement may generally correspond to a predetermined range of values above the exceeded parameter limit at which it believed that there is an increased likelihood that the gearbox 36 may be subject to damage (i.e., damage above that of normal wear and tear), with the likelihood of damage increasing with each sequential Severity Level. For example, Severity Level #1 may correspond to a range of values closest to the exceeded parameter limit and Severity Level #3 may correspond to a range of values furthest from the exceeded predetermined parameter limit. Thus, in one embodiment, assuming that the oil temperature in the gearbox 36 has exceeded its operational limit, Severity Level #1 may correspond to range of temperature values between the predetermined temperature value at the operational limit and a second temperature value exceeding the predetermined temperature value. Similarly, Severity Level #2 may correspond to a range of temperature values between the second temperature value and a third temperature value exceeding the second temperature value, with Severity Level #3 corresponding to a range of temperature values between the third temperature value and a fourth temperature value exceeding the third temperature value.

In alternative embodiments, it should be appreciated that the decision logic may include any other suitable number of Severity Levels, such as by including less than three Severity Levels or greater than three Severity Levels.

It should also be appreciated the particular value ranges corresponding to the Severity Levels for each oil parameter and each predetermined parameter limit may generally vary depending on numerous factors including, but not limited to, any historical data available regarding operation of the gearbox 36 and/or any operating constraints of the gearbox 36. However, it is well within the purview of one of ordinary skill in the art to determine what value ranges should be utilized with each Severity Level for a given oil parameter and parameter limit based on the characteristics of the gearbox 36 and/or any other suitable factors.

Additionally, as shown FIGS. 6 and 7, the decision logic may generally vary depending on which of the Severity Levels is assigned to the oil parameter measurement exceeding one or more of its predetermined parameter limits. For instance, in several embodiments, as the number for the Severity Level increases, the degree, complexity and/or urgency of the recommended course of action may also increase. Thus, as will be described below, the Severity Level #1 decision logic may simply require analysis of a second oil parameter measurement whereas the Severity level #3 decision logic may require immediate shutdown of the wind turbine 10.

Thus, as shown in 214, when Severity Level #1 is assigned to an oil parameter measurement exceeding one or more of its predetermined parameter limits, the first measurement for that particular oil parameter may be stored/archived (e.g., stored in a memory device 48 (FIG. 3) of the turbine controller 26 and/or the separate controller 42) and a second measurement may be taken. Additionally, in 216, the second measurement may be compared to the predetermined operational limit for that particular oil parameter (i.e., the same operational limit compared to the first measurement in 204 (FIG. 5)). If the second measurement exceeds the operational limit, the status may be elevated to Severity Level #2 and the decision logic pertaining to Severity Level #2 may then be performed (described below with reference to FIG. 7). However, if the second measurement does not exceed the operational limit, the decision logic pertaining to the change rate limit shown in 218 may be performed.

In 218, the second measurement may be compared to the predetermined change rate limit for the particular oil parameter being analyzed (i.e., the same change rate limit used to assess the two preceding measurements in 206 (FIG. 5)). As indicated above, the change rate limit may initially be analyzed in 206 by comparing the limit to the difference between consecutive measurements for a particular oil parameter. For instance, in one embodiment, the difference between an initial base measurement and a subsequent first measurement may be compared to the change rate limit. In such an embodiment, the difference between the initial base measurement and the second measurement (i.e., the measurement taken directly after the first measurement) may be utilized for the comparison required in 218. If the second measurement still produces a rate of change that exceeds the change rate limit, the status may be elevated to Severity Level #2 and the decision logic pertaining to Severity Level #2 may then be performed (described below with reference to FIG. 7). However, if second measurement does not produce a rate of change exceeding the operational limit, the decision logic may be returned to START (FIG. 5). In other words, the status may be downgraded to healthy or Severity Level #0, indicating that no further action within the decision logic is required for that particular sequence and returning the decision logic to START, whereat new oil parameter and/or time measurements will be obtained in accordance with 202.

Referring particularly now to FIG. 7, in 220, when Severity Level #2 is assigned to an oil parameter measurement exceeding one or more of its predetermined parameter limits, a statistical analysis may be performed on one or more of the oil parameters. For instance, in one embodiment, all of the previous measurements made for the oil parameter exceeding its predetermined parameter limit(s) may be analyzed using one or more suitable statistical models (e.g., one or more probability distribution functions and/or one or more probability density functions) in order to provide a means to predict the likelihood of damage occurring to the gearbox 36 based on the historical data available for that particular oil parameter. Additionally, in 222, the results of the statistical analysis (e.g., the determined statistical trends) may then be compared to an allowable trend limit. In such an embodiment, the allowable trend limit may generally correspond to a predetermined correlation between the particular oil parameter being analyzed and the likelihood of damage occurring to the gearbox 36. For example, it may be expected that normal gearbox usage should generate a linear rate of change over time with respect to the number of particles contained within the oil (i.e., particle count). Thus, the allowable trend limit for particle count may correspond to a predetermined amount of variation from this expected linear trend (e.g., a predetermined amount of slope change from the linear trend). If the results of the statistical analysis exceed the allowable trend limit, the status may be elevated to Severity Level #3 and the decision logic pertaining to Severity Level #3 may then be performed. However, if the results of the statistical analysis do not exceed the allowable trend limit, the decision logic pertaining to previous Severity Level #2 sequences shown in 224 may then be performed.

In other embodiments of the present subject matter, the statistical analysis performed in 220 may correspond to a statistical analysis of one or more oil parameter pairings. For instance, in a particular embodiment, a statistical analysis of one or more of the following oil parameter pairings may be performed: oil temperature and oil viscosity, particle count and particle size, oil temperature and particle count and/or oil viscosity and water content. Of course, it should be appreciated that various other suitable oil parameter pairings may also be analyzed. Regardless of the parameter pairing(s) being utilized, any previous measurements taken for the oil parameters included in the pairing(s) may be analyzed using one or more suitable statistical models (e.g., one or more probability distribution functions and/or one or more probability density functions) in order to provide a means to predict the likelihood of damage occurring to the gearbox 36 based on the historical data available for such parameter parings. Additionally, in 222, the results of the statistical analysis (e.g., the determined statistical trends) may then be compared to an allowable trend limit. In such an embodiment, the allowable trend limit may generally correspond to a predetermined correlation between the parameter pairing(s) being analyzed and the likelihood of damage occurring to the gearbox 36. For instance, it may be expected that changes in oil viscosity are at least partially dependent on changes in oil temperature (e.g., as the oil temperature increases, it may be expected that the oil viscosity may also increase by a predetermined amount). Thus, the allowable trend limit for the parameter pairing of oil temperature and oil viscosity may correspond to a predetermined amount of variation from the expected relationship between such parameters. Similar to the embodiment described above, if the results of the statistical analysis exceed the allowable trend limit, the status may be elevated to Severity Level #3 and the decision logic pertaining to Severity Level #3 may then be performed. However, if the results of the statistical analysis do not exceed the allowable trend limit, the decision logic pertaining to previous Severity Level #2 sequences shown in 224 may then be performed.

It should be readily appreciated that the allowable trend limits utilized in 222 may generally vary depending on numerous factors including, but not limited to, any historical data available regarding operation of the gearbox 36 and/or any operating constraints of the gearbox 36. However, it is well within the purview of one of ordinary skill in the art to determine such allowable trend limits based on the characteristics of the gearbox 36 and/or any other suitable factors.

Referring still to FIG. 7, in 224, it is determined whether any previous Severity Level #2 logic sequences have been performed during the current service interval. If a Severity level #2 logic sequence has already been performed, the decision logic for Severity Level #2 is reinitiated by taking another measurement and performing another statistical analysis in accordance with 220. However, if a Severity Level #2 logic sequences had not been previously performed, the status may be downgraded to Severity Level #1 and the decision logic pertaining to Severity Level #1 (FIG. 6) may then be performed.

Additionally, as shown in 226, when Severity Level #3 is assigned to the oil parameter measurement exceeding one or more of its predetermined parameter limits, an immediate shutdown of the wind turbine is initiated and suitable maintenance operations are scheduled for the gearbox 36. Such immediate action may generally be required when the oil parameter measurement is substantially in excess of one or more of its predetermined parameter limits, thereby indicating a substantial likelihood of present and/or future damage to the gearbox 36. In addition to shutting down and scheduling maintenance, some or all of the oil parameter measurements that were recorded leading up to the wind turbine shutdown may also be downloaded in order to make such information available for immediate analysis.

Additionally, due to the extreme nature of an immediate shutdown of the wind turbine 10, it may be desirable to check the status of the disclosed sensor(s) 40 (FIG. 3) to determine whether the oil parameter measurements being transmitted by the sensor(s) 40 are likely to be accurate. For instance, as is generally known, measurements transmitted by sensors may contain anomalies due to sensor failures and/or mis-readings. Thus, as shown in FIG. 7, in one embodiment, a sensor failure analysis may be performed in 228 (indicated by the dashed lines) to check for anomalies prior to performing the shutdown. In general, any suitable method known in the art for detecting sensor failures may be utilized in 228. For instance, known methods for detecting sensors failure include, but are not limited to, statistical methods (e.g., hypothesis testing, cluster analysis, hidden Markov Models and the like), artificial intelligence methods (e.g., neural networks) and/or model-based methods capable of generating residuals for failure detection (e.g., Kalman filters and extension, parameter estimation, empirical adaptive system identification and the like).

It should be appreciated that, in alternative embodiments, the sensor failure analysis provided in 228 may be performed at any other suitable point in the decision logic shown in FIGS. 5-8. For example, in one embodiment, the sensor failure analysis may be performed during the data acquisition process (e.g., contemporaneously with and/or immediately after monitoring the oil parameters in accordance with 202 (FIG. 5)). In another embodiment, the sensor failure analysis may be performed at a different point within the Severity Level logic sequence, such as by being performed before or after a Severity Level is assigned in accordance with 212 (FIG. 6), so that sensor failures may also be detected prior to the performance of any decision logic under Severity Level #1 and/or Severity Level #2.

Referring particularly now to FIG. 8, one embodiment of a maintenance logic sequence that may be performed when it is determined that one or more of the time measurements for the current service interval exceed one or more of the predetermined time limits (e.g., the operational hour and/or elapsed time limits) is illustrated. As shown, in 230, it is determined whether more than one Severity Level #1 logic sequences have been performed within the current service interval. If multiple Severity Level #1 events have not occurred, the decision logic pertaining to Severity Level #2 events shown in 234 may be performed. However, if multiple Severity Level #1 events have occurred, in 232, it may be determined whether the amount of Severity Level #1 events exceed a Level #1 recurrence limit corresponding to a predetermined number of allowable Severity Level #1 events. If the amount of Severity Level #1 events does exceed the Level #1 recurrence limit, a maintenance operation for the gearbox 36 may need to be scheduled in order to check the status of the components of the gearbox 36 and/or to perform other suitable maintenance operations (e.g., changing the oil contained within the gearbox 36 and/or replacing the oil filter within the gearbox 36). However, if the amount of Severity Level #1 events does not exceed the Level #1 recurrence limit, the decision logic pertaining to Severity Level #2 events shown in 234 may be performed.

In 234, it is determined whether a Severity Level #2 logic sequences has been performed within the current service interval. If a Severity Level #2 event has not occurred, the decision logic pertaining to service interval updates shown in 238 may be performed. However, if a Severity Level #2 event has occurred, in 236, it is determined whether the amount of Severity Level #2 events that have occurred exceeds a Level #2 recurrence limit corresponding to a predetermined number of allowable Severity Level #2 events. If the amount of Severity Level #2 events exceeds the Level #1 recurrence limit, a maintenance operation for the gearbox 36 may need to be scheduled in order to check the status of the components of the gearbox 36 and/or to perform other suitable maintenance operations (e.g., changing the oil contained within the gearbox 36 and/or replacing the oil filter within the gearbox 36). However, if the amount of Severity Level #2 events does not exceed the Level #2 recurrence limit, the decision logic pertaining to service interval updates shown in 240 may be performed.

Referring still to FIG. 8, in both 238 and 240, it is determined whether a one-time update has been made to the current service interval. If a one-time update has already been made, a maintenance operation for the gearbox 36 may need to be scheduled in order to check the status of the components of the gearbox 36 and/or to perform other suitable maintenance operations (e.g., changing the oil contained within the gearbox 36 and/or replacing the oil filter within the gearbox 36). However, if a one-time update has not yet been made, the current service interval may be updated and the decision logic may be returned to START.

It should be appreciated that the one-time update may generally correspond to a change made to the time measurements being monitored within the current service interval. For instance, in 242, the amount of operational hours and/or elapsed time within the current service interval may be reduced to allow the wind turbine 10 to operate for a longer period of time before scheduling maintenance given the fact that multiple Severity Level #1 events have not occurred within the service interval (230) and that a Severity Level #2 event has not occurred within the service interval (234). Similarly, in 244, the amount of operational hours and/or elapsed time within the current service interval may be reduced to allow the wind turbine to operate for a longer period of time before scheduling maintenance given the fact that multiple Severity Level #2 events have not occurred within the service interval (236). However, it should be appreciated that the one-time update provided in 244 may generally differ in magnitude from the one-time update provided in 242 given that a Severity Level #2 has already occurred within the sequence prior to performing the update in 244.

It should also be appreciated that, in several embodiments, the scheduling of maintenance operations in accordance with the above described decision logic may take into account whether any other maintenance operations have already been scheduled for the wind turbine. For instance, in one embodiment, maintenance on the gearbox 36 may be scheduled at the same time as other scheduled maintenance in order to limit the amount of turbine downtime and/or to save on labor costs. Alternatively, maintenance on the gearbox 36 may be scheduled irrespective of any other scheduled maintenance.

Additionally, one of ordinary skill in the art should appreciate that the method 100 shown in FIG. 4 and the decision logic shown in FIGS. 5-8 are provided only as examples of methods and/or steps that may be taken to monitor the condition of oil contained within a wind turbine gearbox 36. Thus, it should be appreciated that numerous variations of the method 100 shown in FIG. 4 and the decision logic shown in FIGS. 5-8 may be performed within the scope of the present disclosure. For instance, one or more of the method elements shown in FIG. 4 may be combined with one or more of the steps provided in the decision logic shown in FIGS. 5-8 to create a different oil condition monitoring method. Similarly, only a portion of the method elements shown in FIG. 4 and/or only a portion of the steps provided in the decision logic shown in FIGS. 5-8 may be utilized to perform a suitable oil condition monitoring method.

For instance, in one embodiment of the present subject matter, a suitable method for monitoring the oil condition may include receiving signals corresponding to a plurality of measurements of an oil parameter of the gearbox 36 (e.g., the plurality of oil parameter measurements recorded within the memory device 48 of the turbine controller 26 and/or the separate controller 42 for each oil parameter), determining a time measurement of a service interval of the gearbox 36 (e.g., the amount of operational hours and/or elapsed time within the current service interval), comparing the time measurement to a predetermined time limit (e.g., the operational hour limit and/or the elapsed time limit) and, in the event that the time measurement exceeds the predetermined time limit, determining a recommended course of action based on analysis of the plurality of measurements (e.g., performing the maintenance logic shown in FIG. 8).

Additionally, it should be appreciated that the present subject mater is also directed to a system for monitoring the condition of oil contained within a gearbox 36 (FIG. 2) of a wind turbine. In general, the system may comprise any suitable components that allow for the real time monitoring of oil conditions within a gearbox 36. For instance, in several embodiments, the system may include one or more sensors 40 (FIG. 2) configured to measure an oil parameter of the gearbox 36. Additionally, the system may include a controller (e.g., the turbine controller 26 and/or the separate controller 42) communicatively coupled to the sensor(s) 40, such as through a wired or wireless connection, so that the oil parameter measurements made by the sensor(s) 40 may be transmitted to the controller. Additionally, the controller may include suitable computer-readable instructions that, when implemented, configure the controller to analyze the oil parameter measurements (e.g., by implementing the decision logic shown in FIGS. 5-8). Thus, in one embodiment, the controller may be configured to compare the oil parameter measurements to a predetermined limit for the oil parameter (e.g., the operational limit and/or the change rate limit) and assign a severity level to the oil parameter measurement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring the condition of oil contained within a gearbox of a wind turbine, the method comprising:
   receiving a signal corresponding to a measurement of an oil parameter of the gearbox;
   comparing the measurement to a predetermined limit for the oil parameter;
   in the event that the measurement exceeds the predetermined limit, assigning a severity level to the measurement based on the extent to which the measurement exceeds the predetermined limit; and,
   implementing a predetermined logic sequence for the assigned severity level.

2. The method of claim 1, wherein the predetermined limit comprises at least one of an operational limit for the oil parameter and a change rate limit for the oil parameter.

3. The method of claim 1, wherein receiving the signal corresponding to the measurement of the oil parameter of the gearbox comprises electrically receiving a signal transmitted from a sensor corresponding to a measurement of an oil parameter of the gearbox.

4. The method of claim 1, wherein implementing a predetermined logic sequence for the assigned severity level comprises:
   receiving a signal corresponding to a second measurement of the oil parameter; and,
   comparing the second measurement to the predetermined limit.

5. The method of claim 4, further comprising continuing operation of the wind turbine in the event that the second measurement does not exceed the predetermined limit.

6. The method of claim 4, further comprising:
   conducting a statistical analysis of at least the oil parameter in the event that the second measurement exceeds the predetermined limit; and,
   comparing results of the statistical analysis to an allowable trend limit.

7. The method of claim 6, further comprising shutting down the wind turbine in the event that the results of the statistical analysis exceed the allowable trend limit or continuing operation of the wind turbine in the event that the results of the statistical analysis do not exceed the allowable trend limit.

8. The method of claim 1, wherein implementing a predetermined logic sequence for the assigned severity level comprises:
conducting a statistical analysis of at least the oil parameter; and,
comparing results of the statistical analysis to an allowable trend limit.

9. The method of claim 8, further comprising receiving signals corresponding to measurements of a plurality of oil parameters of the gearbox, wherein conducting the statistical analysis of at least the oil parameter comprises conducting a statistical analysis of at least two of the plurality of oil parameters.

10. The method of claim 8, further comprising shutting down the wind turbine in the event that the results of the statistical analysis exceed the allowable trend limit or continuing operation of the wind turbine in the event that the results of the statistical analysis do not exceed the allowable trend limit.

11. The method of claim 8, further comprising, in the event the results of the statistical analysis do not exceed the allowable trend limit, determining whether the statistical analysis was previously conducted during a current service interval of the gearbox.

12. The method of claim 1, wherein the predetermined logic sequence varies for each severity level.

13. The method of claim 1, further comprising performing a sensor failure analysis in the event that the measurement exceeds the predetermined limit.

14. A method for monitoring the condition of oil contained within a gearbox of a wind turbine, the method comprising:
receiving signals corresponding to a plurality of measurements of an oil parameter of the gearbox;
determining a time measurement of a service interval of the gearbox;
comparing the time measurement to a predetermined time limit; and,
in the event that the time measurement exceeds the predetermined time limit, determining a recommended course of action based on analysis of the plurality of measurements.

15. The method of claim 14, wherein determining the recommended course of action based on analysis of the plurality of measurements comprises:
determining an amount of times that the plurality of measurements exceeded a predetermined parameter limit; and,
comparing the amount of times to a recurrence limit.

16. The method of claim 15, further comprising scheduling maintenance on the gearbox in the event that the amount of times exceeds the recurrence limit.

17. The method of claim 15, further comprising determining if a one-time update has been made to the service interval in the event that the amount of times does not exceed the recurrence limit.

18. The method of claim 17, further comprising updating the service interval in the event that the one-time update has not been made to the service interval.

19. The method of claim 17, further comprising scheduling maintenance on the gearbox in the event that the one-time update has been made to the service interval.

20. The method of claim 14, wherein the time measurement comprises at least one of an amount of operational hours within the service interval and an amount of elapsed time within the service interval.

* * * * *